United States Patent
Nishigaki

(10) Patent No.: US 8,933,645 B2
(45) Date of Patent: Jan. 13, 2015

(54) LIGHTING CONTROL SYSTEM AND CENTRAL CONTROL APPARATUS

(71) Applicant: Toshiba Lighting & Technology Corporation, Yokosuka-shi, Kanagawa (JP)

(72) Inventor: Hidenori Nishigaki, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 9 days.

(21) Appl. No.: 13/780,426

(22) Filed: Feb. 28, 2013

(65) Prior Publication Data

US 2013/0249436 A1    Sep. 26, 2013

(30) Foreign Application Priority Data

Mar. 26, 2012 (JP) ................................. 2012-070083

(51) Int. Cl.
*H05B 37/02* (2006.01)
(52) U.S. Cl.
CPC ............ *H05B 37/02* (2013.01); *H05B 37/0227* (2013.01); *H05B 37/0272* (2013.01)
USPC ....................................................... 315/297
(58) Field of Classification Search
CPC .......................... H05B 37/0272; H05B 33/0869
USPC .......................... 315/152, 153, 156, 312, 297; 362/23.07, 23.08, 23.11; 340/5.61, 340/5.64
See application file for complete search history.

(56) References Cited

U.S. PATENT DOCUMENTS

| | | | |
|---|---|---|---|
| 2006/0193133 A1* | 8/2006 | Von Der Brelie | 362/276 |
| 2009/0189530 A1* | 7/2009 | Ashdown et al. | 315/152 |
| 2010/0007514 A1* | 1/2010 | Sejkora | 340/825.22 |
| 2013/0234603 A1* | 9/2013 | Van Der Veen et al. | 315/152 |

* cited by examiner

*Primary Examiner* — Minh D A
(74) *Attorney, Agent, or Firm* — Banner & Witcoff, Ltd.

(57) ABSTRACT

A lighting control system includes a central control apparatus and plural luminaires. A light color of each of the plural luminaires can be changed and each of them is assigned to one of plural groups to which different light colors are assigned or is duplicately assigned to the plural groups. The central control apparatus includes a control part and an output part. The control part generates control signals for controlling the light colors of the plural luminaires and causes a light color of a luminaire overlapping with the plural groups or an adjacent luminaire to become an intermediate light color between the assigned light colors for the respective plural groups when the plural luminaires assigned to the plural groups are lit and controlled. The output part outputs the control signals generated by the control part to the plural luminaires.

10 Claims, 4 Drawing Sheets

FIG.2

| GROUP | LED LUMINAIRE |
|---|---|
| G1 | L1、L2、L3、L4、L5、L6、L7、L8、L9 |
| G2 | L7、L8、L9、L10、L11、L12、L13、L14、L15 |
| G3 | L13、L14、L15、L16、L17、L18、L19、L20、L21 |
| ⋮ | ⋮ |

FIG.3

| LED LUMINAIRE | ADJACENT IN UPPER DIRECTION | ADJACENT IN LOWER DIRECTION | ADJACENT IN LEFT DIRECTION | ADJACENT IN RIGHT DIRECTION |
|---|---|---|---|---|
| L1 | — | L2 | — | L4 |
| L2 | L1 | L3 | — | L5 |
| L3 | L2 | — | — | L6 |
| L4 | — | L5 | L1 | L7 |
| L5 | L4 | L6 | L2 | L8 |
| L6 | L5 | — | L3 | L9 |
| ⋮ | ⋮ | ⋮ | ⋮ | ⋮ |

LIGHTING CONTROL SYSTEM AND CENTRAL CONTROL APPARATUS

CROSS-REFERENCE TO RELATED APPLICATION

This application is based upon and claims the benefit of priority from the prior Japanese Patent Application No. 2012-70083 filed on Mar. 26, 2012; the entire contents of which are incorporated herein by reference.

FIELD

Embodiments described herein relate generally to a lighting control system and a central control apparatus.

BACKGROUND

Hitherto, for example, office buildings, various facilities or the like are provided with a lighting control system to remotely control lighting loads, such as luminaires, arranged in each lighting area such as each floor or each area.

In this lighting control system, plural lighting apparatuses are communicably connected to a central control apparatus as a lighting control apparatus through a transmission line, and the respective lighting apparatuses are controlled by signals from the central control apparatus. Besides, since the central control apparatus communicates with the plural lighting apparatuses through the transmission line, the central control apparatus can integratedly control the lighting apparatuses.

In this kind of lighting control system, a luminaire that can change light color, such as an LED luminaire using, for example, a light-emitting element of a light-emitting diode (hereinafter referred to as LED), is sometimes used as the lighting apparatus.

In the lighting control system, lighting control is sometimes performed such that plural LED luminaires are divided into plural groups, and a different light color is assigned to each of the groups.

BRIEF DESCRIPTION OF THE DRAWINGS

FIG. 2 is an explanatory view for explaining an example of an assignment information table 11 stored in a ROM 10.

FIG. 3 is an explanatory view for explaining an example of an adjacent information table 12 stored in the ROM 10.

DETAILED DESCRIPTION

In general, according to one embodiment, a lighting control system includes a central control apparatus, plural luminaires whose light colors can be respectively changed and which are assigned to one of plural groups to which different light colors are assigned or are duplicately assigned to the plural groups, a control part that is provided in the central control apparatus, generates control signals for controlling the light colors of the plural luminaires and causes a light color of a luminaire overlapping with the plural groups or an adjacent luminaire to become an intermediate light color between the assigned light colors for the respective plural groups when the plural luminaires assigned to the plural groups are lit and controlled, and an output part that is provided in the central control apparatus and outputs the control signals generated by the control part to the plural luminaires.

Hereinafter, an embodiment will be described in detail with reference to the drawings.

Figure 1:
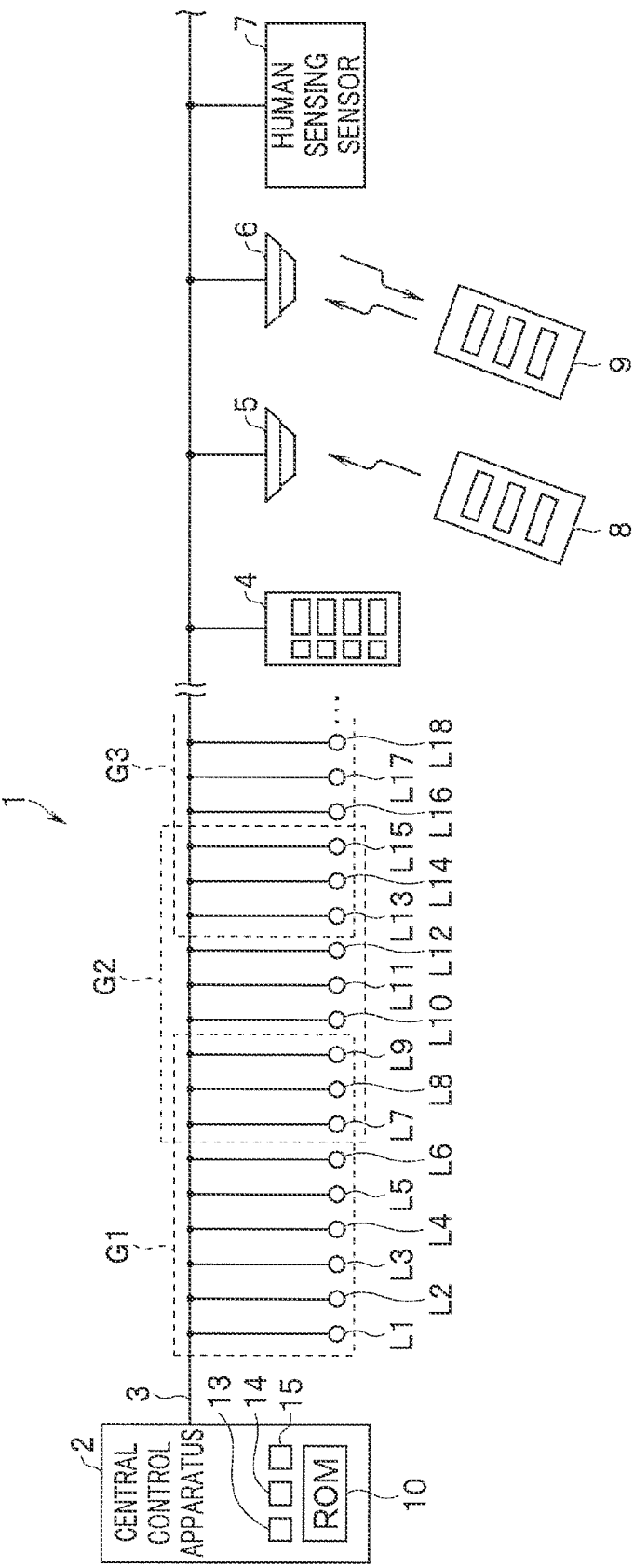
FIG. 1 is a structural view showing the whole structure of a lighting control system of an embodiment.

FIG. 1 is a structural view showing the whole structure of a lighting control system of this embodiment.

A lighting control system 1 shown in FIG. 1 includes a central control apparatus 2 to remotely control luminaires installed in, for example, each lighting area, such as each floor or each area, of office buildings, various facilities or the like.

Plural LED luminaires L1 to L18 constituting luminaires whose light colors can be changed, a wall switch 4, wireless receivers 5 and 6 and a human sensing sensor 7 are connected to the central control apparatus 2 through a transmission line 3. Besides, operation signals are transmitted to the wireless receiver 5 from a wireless transmitter 8 to transmit a signal by wireless and are transmitted to the wireless receiver 6 from a wireless transceiver 9 to transmit and receive a wireless signal. Incidentally, infrared rays, Bluetooth (registered trademark), Zigbee (registered trademark), Wi-Fi (registered trademark), or other standardized wireless communication systems can be adopted as the wireless signal.

In this embodiment, although description will be made while the LED luminaires L1 to L18 whose light colors can be changed are used as the luminaires, no limitation is made to this, and other luminaires may be adopted as long as the light colors can be changed. For example, instead of the LED luminaires L1 to L18, OLED luminaires may be adopted which use a light source such as an organic light emitting diode (OLED) whose light color can be changed.

The plural LED luminaires L1 to L18, the wall switch 4, the wireless receivers 5 and 6, the human sensing sensor 7, the wireless transmitter 8 and the wireless transceiver 9 constitute lighting apparatuses connected to the transmission line 3, and the plural lighting apparatuses are controlled by the central control apparatus 2 through the transmission line 3. That is, the central control apparatus 2 integratedly controls the system.

The plural LED luminaires L1 to L18 are respectively assigned to specified groups. The assignment information is stored as a table in a ROM 10 of the central control apparatus 2.

FIG. 2 is an explanatory view for explaining an example of an assignment information table 11 stored in the ROM 10.

As shown in FIG. 2, the LED luminaires L1 to L9 are assigned to a group G1, and the LED luminaires L7 to L15 are assigned to a group G2. Besides, in addition to the LED luminaires L13 to L18, three not-shown LED luminaires (LED luminaires 19 to 21) are assigned to a group G3. As stated above, the LED luminaires L7 to 9 are duplicately assigned to the group G1 and the group G2, and the LED luminaires L13 to L15 are duplicately assigned to the group G2 and the group G3. In the following description, when there is no limitation in the LED luminaires L1 to L18, they are simply referred to as LED luminaires L. Besides, when there is no limitation in the groups G1 to G3, they are simply referred to as groups G.

Incidentally, the number of LED luminaires L assigned to the respective groups G1, G2 and G3 is not limited to nine, and another number of LED luminaires L may be assigned. Besides, a different number of LED luminaires L may be assigned to each of the groups G1, G2 and G3.

Figure 4:
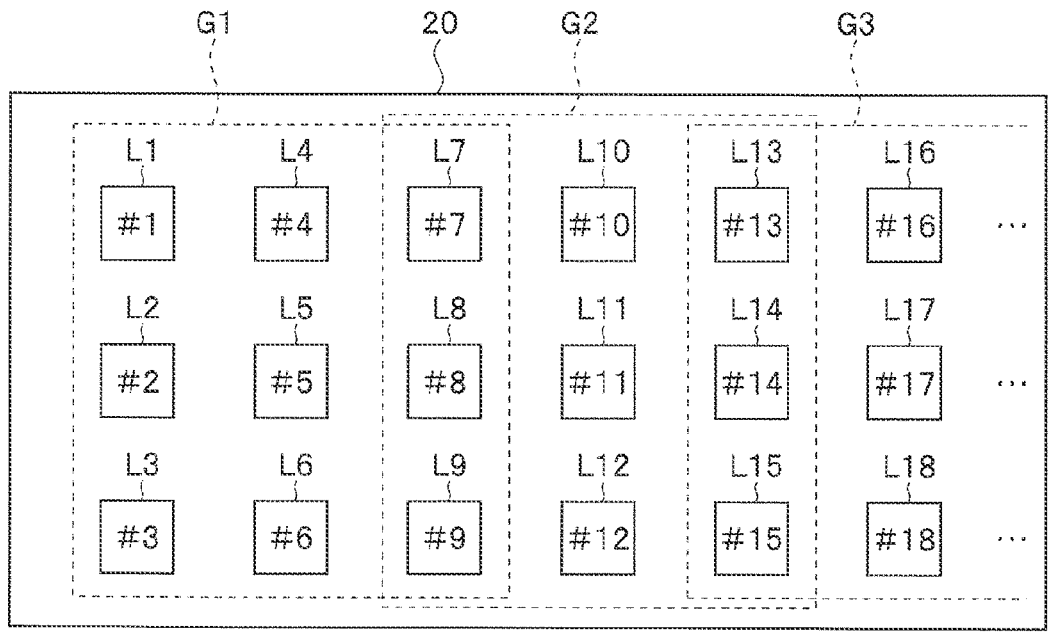
FIG. 4 is a plan view showing an example of the layout of a part of plural LED luminaires L arranged on a ceiling surface.

As shown in FIG. 4 to be described later, the respective LED luminaires L1 to L18 are arranged on a ceiling 20 in a specified arrangement relation. With respect to each the LED luminaires L1 to L18 arranged as shown in FIG. 4, adjacent information of LED luminaires L adjacent in the periphery, for example, LED luminaires L adjacent in front, back, right and left directions is stored as a table in the ROM 10.

FIG. 3 is an explanatory view for explaining an example of an adjacent information table 12 stored in the ROM 10.

As shown in FIG. 3, in the adjacent information table 12, each of the LED luminaires L1 to L18 is correlated with LED luminaires L adjacent in the front, back, right and left directions of each of the LED luminaires L1 to L18. Incidentally, the front, back, right and left directions are identical to upper, lower, right and left directions when viewed toward FIG. 4.

For example, since an LED luminaire L adjacent to the LED luminaire L1 in the upper direction does not exist as shown in FIG. 4, "-" is shown in the column of the LED luminaire L adjacent to the LED luminaire L1 in the upper direction in FIG. 3. Besides, since an LED luminaire L adjacent to the LED luminaire L1 in the lower direction is the LED luminaire L2, "L2" is shown in the column of the LED luminaire L adjacent to the LED luminaire L1 in the lower direction in FIG. 3. Similarly, "-" is shown in the column of the LED luminaire L adjacent to the LED luminaire L1 in the left direction in FIG. 3, and "L4" is shown in the column of the LED luminaire L adjacent to the LED luminaire L1 in the right direction.

The central control apparatus 2 performs ON/OFF control and light color control of the LED luminaires L1 to L18 assigned to the respective groups G1, G2 and G3 based on the assignment information of the assignment information table 11 and the adjacent information of the adjacent information table 12.

Incidentally, the ROM 10 stores programs for performing the light color control of the LED luminaires L and the like in addition to the assignment information table 11 and the adjacent information table 12. Besides, the central control apparatus 2 includes a CPU 13, a RAM 14 and an output part 15. The CPU 13 of the central control apparatus 2 reads a specified program stored in the ROM 10, expands the program into the RAM 14 and executes the program to perform the after-described light color control or the like.

Each of the plural LED luminaires L1 to L18 includes, for example, a white LED, a red (R) LED, a green (G) LED and a blue (B) LED. The CPU 13 constituting the control part generates control signals outputted to the respective LEDs so that the LED luminaire L is lit with a light color assigned or changed by a user which will be described later. Incidentally, the CPU 13 constituting the control part may be provided outside the central control apparatus 2. The output part 15 of the central control apparatus 2 outputs the control signals generated by the CPU 13 to the respective LEDs of the LED luminaire L so that the each of them is lit at a specified light intensity. Incidentally, the lighting control of the respective LEDs of the LED luminaire L may be performed such that for example, the output part 15 outputs the light color information generated by the CPU 13 to each of the LED luminaires L, and each of the LED luminaires L receiving the light color information lights and controls the respective LEDs at the specified light intensity based on the light color information.

The wall switch 4 includes on and off switches corresponding to the groups G as sets of the plural LED luminaires L1 to L18, and light color adjustment switches to adjust the light colors of the respective groups G. Based on the switch operation by the user, the wall switch 4 outputs on-off control signals to turn on or off the corresponding groups G including the plural LED luminaires L1 to L18, and light color control signals to the central control apparatus 2.

The wireless receiver 5 receives an infrared ray signal transmitted from the wireless transmitter 8. The wireless receiver 5 includes a transmission interface to enable connection to the transmission line 3, and is connected to the transmission line 3 through the transmission interface. Besides, the wireless receiver 5 includes an address setting part to store address data of the wireless receiver 5, and an infrared ray reception unit to receive infrared rays. Incidentally, the wireless receiver 5 includes an infrared ray transmission unit to enable transmission of infrared rays.

The wireless receiver 6 receives an infrared ray signal transmitted from the wireless transceiver 9. The wireless receiver 6 includes a transmission interface to enable connection to the transmission line 3, and is connected to the transmission line 3 through the transmission interface. Besides, the wireless receiver 6 includes an address setting part to store address data of the wireless receiver 6 and an infrared ray reception unit to receive infrared rays. Incidentally, the wireless receiver 6 includes an infrared ray transmission unit to enable transmission of infrared rays to the wireless transceiver 9.

The wireless transmitter 8 transmits lighting-extinction information of the LED luminaires L1 to L18 and light color information to the wireless receiver 5 by, for example, infrared rays. The wireless transmitter 8 includes an infrared ray transmission part to transmit the lighting control information by infrared rays, a memory to store address data of the wireless transmitter 8 and the like.

The wireless transceiver 9 is a terminal for transmitting and receiving the lighting and extinction information of the LED luminaires L1 to L18 and the light color information to and from the wireless receiver 6 by infrared rays. The wireless transceiver 9 includes an infrared ray transmission part to transmit infrared rays, an infrared ray reception part to receive infrared rays, an operation button to perform lighting and extinction control of the LED luminaires L1 to L18 and light color control, and a memory to store address data of the wireless transceiver 9.

The human sensing sensor 7 is a sensor terminal to detect the existence of a person and for performing lighting control of the LED luminaires L1 to L18. The human sensing sensor 7 is connected to the transmission line 3 through a transmission interface. Further, the human sensing sensor 7 includes an infrared ray detection part to detect infrared rays radiated from a person in order to detect the existence of the person, and a memory to store address data of the human sensing sensor 7.

Besides, although not shown, in addition to the human sensing sensor 7, another sensor terminal is connected to the transmission line 3 through a transmission interface. The another sensor terminal is, for example, a terminal for dimming-controlling the luminaire in order to control the illuminance of the desk surface so as to be constant, and includes a sensor part to detect light, a display part, and a memory to store address data of the sensor terminal.

In the lighting control system 1 as stated above, since the central control apparatus 2 communicates with the plural lighting apparatuses through the transmission line 3, the central control apparatus 2 integratedly controls the lighting apparatuses, and can perform the lighting and extinction control of the plural LED luminaires L1 to L18 and the light color control.

Here, a specific arrangement structure of the LED luminaires L will be described with reference to FIG. 4. FIG. 4 is a plan view showing an example of the layout of a part of the plural LED luminaires L arranged on the ceiling surface.

The LED luminaires L1 to L18 are arranged as shown in FIG. 4. The LED luminaires L1 to L9 are assigned to a group G1, the LED luminaires L7 to L15 are assigned to a group G2, and the LED luminaires L13 to L21 (not shown) are assigned to a group G3.

Different light colors are respectively assigned to the groups G1, G2 and G3. For example, in this embodiment, a color temperature of 4000 K (Kelvin) is assigned to the LED luminaires L1 to L9 of the group G1, a color temperature of 8000 K is assigned to the LED luminaires L7 to L15 of the group G2, and a color temperature of 12000 K is assigned to the LED luminaires L13 to L21 (not shown) of the group G3. Incidentally, in the following, the control at the time of ON/OFF of the groups G1 and G2 will be described.

When only the group G1 is turned ON based on the switch operation by the user, the central control apparatus 2 controls so that the LED luminaires L1 to L9 of the group G1 are lit at the assigned color temperature of 4000 K. Similarly, when only the group G2 is turned ON based on the switch operation by the user, the central control apparatus 2 controls so that the LED luminaires L7 to L15 of the group G2 are lit at the assigned color temperature of 8000 K.

On the other hand, when the group G1 and the group G2 are simultaneously turned ON (or one of the groups G is in the ON state and the other group is turned ON) based on the switch operation by the user, the central control apparatus 2 controls so that the LED luminaires L7 to L9 duplicately assigned to the group G1 and the group G2 are lit at an intermediate color temperature between the color temperatures assigned to the group G1 and the group G2. At this time, the central control apparatus 2 refers to the assignment information table 11, and thereby detects the LED luminaires L7 to L9 duplicately assigned to the group G1 and the group G2.

The central control apparatus 2 controls so that the LED luminaires L7 to L9 are lit at the intermediate color temperature of 6000 K between the color temperature of 4000 K assigned to the group G1 and the color temperature of 8000 K assigned to the group G1. By this, the LED luminaires L1 to L6 is lit at the color temperature of 4000 K, the LED luminaires L7 to L9 are lit at the color temperature of 6000 K, and the LED luminaires L10 to L15 are lit at the color temperature of 8000 K.

Further, the central control apparatus 2 refers to the adjacent information table 12, and thereby controls so that a certain LED luminaire is lit at an intermediate light color between light colors assigned to LED luminaires L adjacent in the front, back, right and left directions. For example, the color temperature of the LED luminaire L1 adjacent to the LED luminaire L4 in the left direction is 4000 K, the color temperature of the LED luminaire L5 adjacent to the LED luminaire L4 in the lower direction is 4000 K, and the color temperature of the LED luminaire L7 adjacent to the LED luminaire L4 in the right direction is 6000 K.

Thus, the central control apparatus 2 recalculates the color temperature so that the color temperature becomes an intermediate one between 4000 K and 6000 K, and controls so that the LED luminaire L4 is lit at a color temperature of 5000 K. Also with respect to the LED luminaires L5 and L6, the central control apparatus 2 performs the same control, and controls so that the LED luminaires are lit at the color temperature of 5000 K. Besides, also with respect to the LED luminaires L10 to L12, the central control apparatus 2 performs the same process, recalculates the color temperature so that the color temperature becomes an intermediate one between 6000 K and 8000 K, and controls so that the LED luminaires L10 to L12 are lit at a color temperature of 7000 K.

By this, the LED luminaires L1 to L3 are lit at the color temperature of 4000 K, the LED luminaires L4 to L6 are lit at the color temperature of 5000 K, the LED luminaires L7 to L9 are lit at the color temperature of 6000 K, the LED luminaire L10 to L12 are lit at the color temperature of 7000 K, and the LED luminaires L13 to L15 are lit at the color temperature of 8000 K. As a result, the color transition of the ceiling surface is smoothly represented.

Incidentally, when the group G1 and the group G2 are in the ON state, and the group G3 is turned ON, the central control apparatus 2 refers to the light colors assigned to the groups G1, G2 and G3, the assignment information table 11 and the adjacent information table 12, recalculates the light colors of the LED luminaires L1 to L21 (not shown) and performs the lighting control.

Besides, when a light color assigned to a certain group G is changed used on the switch operation by the user, the central control apparatus 2 recalculates the light color of an LED luminaire L overlapping with plural groups G and the light color of an LED luminaire L adjacent to a certain LED luminaire L, and performs the lighting control.

Figure 5:
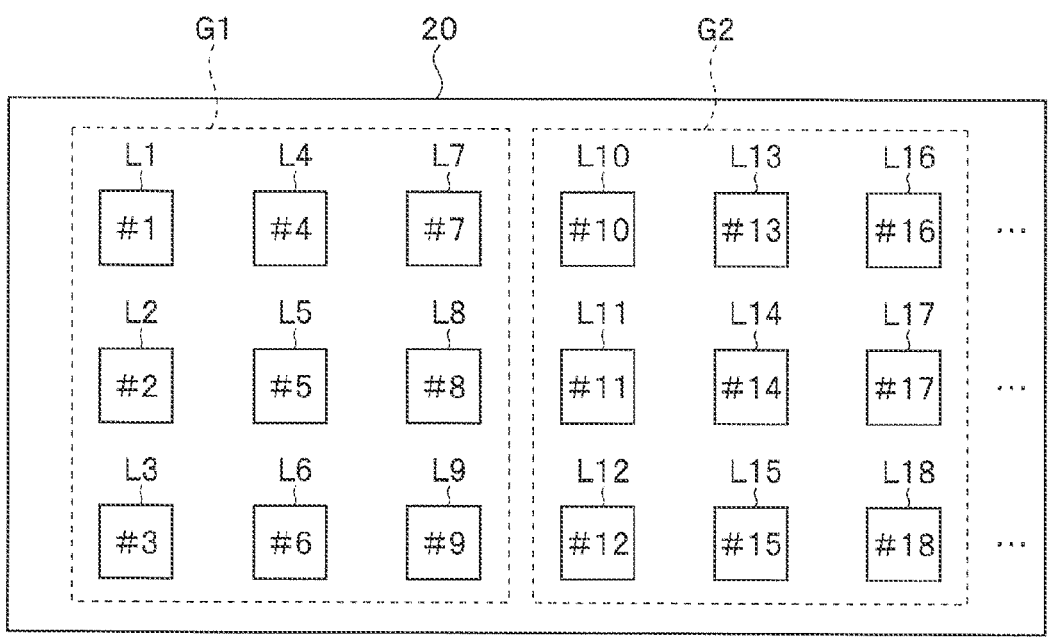
FIG. 5 is a plan view showing another example of the layout of a part of the plural LED luminaires L arranged on the ceiling surface.

FIG. 5 is a plan view showing another example of the layout of a part of the plural LED luminaires L arranged on the ceiling surface.

The LED luminaires L1 to L18 are arranged as shown in FIG. 5. The LED luminaires L1 to L9 are assigned to a group G1, and the LED luminaires L10 to L18 are assigned to a group G2. That is, in the example of FIG. 5, there is no LED luminaire L duplicately assigned to the group G1 and the group G2. Incidentally, in the example of FIG. 5, a color temperature of 4000 K is assigned to the LED luminaires L1 to L9 of the group G1, and a color temperature of 9000 K is assigned to the LED luminaires L10 to L18 of the group G2.

When only the group G1 or the group G2 is turned ON based on the switch operation by the user, the central control apparatus 2 controls so that the LED luminaires L1 to L9 of the group G1 are lit at the assigned color temperature of 4000 K, or the LED luminaires L10 to L18 or the group G2 are lit at the assigned color temperature of 9000 K.

On the other hand, when the group G1 and the group G2 are simultaneously turned ON (or one of the groups is in the ON state and the other group G is turned ON) based on the switch operation by the user, the central control apparatus 2 refers to the adjacent information table 12, and thereby controls so that a certain LED luminaire L is lit at an intermediate light color between light colors assigned to LED luminaires L adjacent in the front, back, right and left directions. Incidentally, the light color may be, for example, a light color on the xy chromaticity diagram, and the intermediate light color may be an intermediate color on the xy chromaticity diagram.

By this, the LED luminaires L1 to L3 are lit at a color temperature of 4000 K, the LED luminaires L4 to L6 are lit at a color temperature of 5000 K, the LED luminaires L7 to L9 are lit at a color temperature of 6000 K, the LED luminaires L10 to L12 are lit at a color temperature of 7000 K, the LED luminaires L13 to L15 are lit at a color temperature of 8000 K, and the LED luminaires L16 to L18 are lit at a color temperature of 9000. As a result, the color transition of the ceiling surface is smoothly represented.

Figure 6:
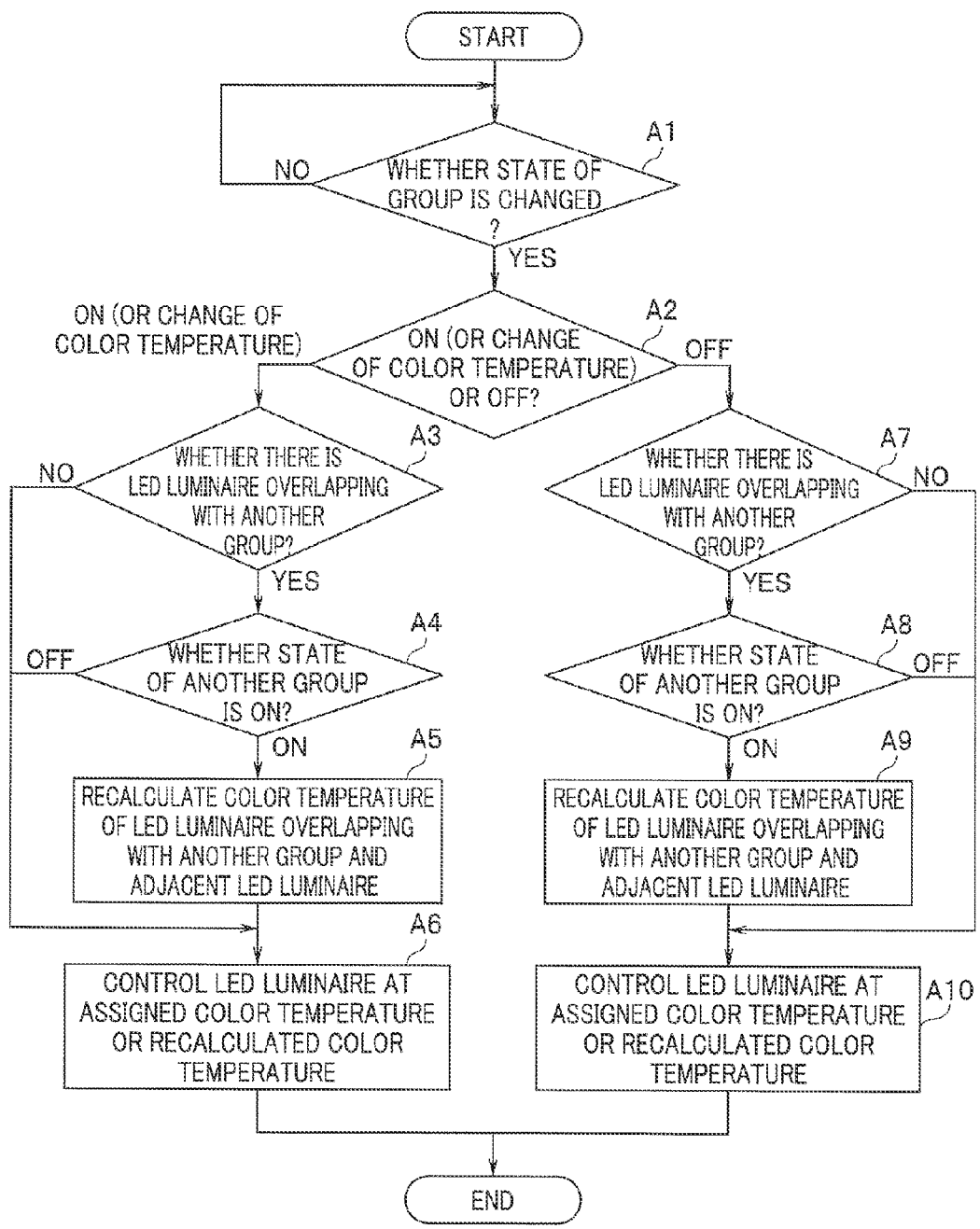
FIG. 6 is a flowchart showing an example of light color control of a CPU 13 of a central control apparatus 2.

Next, the operation of the lighting control system of the embodiment will be described with reference to FIG. 6. FIG. 6 is a flowchart showing an example of the light color control of the CPU 13 of the central control apparatus 2.

The CPU 13 of the central control apparatus 2 reads a program of executing a process shown in FIG. 6 from the ROM 10 and executes the program. Incidentally, the program is executed when, for example, the user operates the wall switch 4.

That is, when the user operates the wall switch 4, the CPU 13 determines at processing of Act 1 whether a change occurs in a state of a certain group G. If no change occurs in the state, return is made to Act 1, and the same processing is repeated. If the change occurs in the state, shift is made to processing of Act 2.

In the processing of Act 2, the CPC 13 determines whether the change of the state is ON (or the change of light color) or OFF. If the change of the state is ON (or the change of light color), shift is made to processing of Act 3. If the change of the state is OFF, shift is made to Act 7.

In the processing of Act 3, if the change of the state is ON (or the change of light color), the CPU 13 determines whether there is an LED luminaire L overlapping with another group G. If there is an overlapping LED luminaire L, shift is made to processing of Act 4. If there is no overlapping LED luminaire L, shift is made to processing of Act 6.

In the processing of Act 4, if there is an overlapping LED luminaire L, the CPU 13 determines whether the state of the another group G is ON or not. If the state of the another group G is ON, shift is made to processing of Act 5. If the state of the another group G is not ON, shift is made to processing of Act 6.

In the processing of Act 5, if the state of the another group G is ON, the CPU 13 recalculates light colors of LED luminaires L overlapping with the another group G and adjacent LED luminaires L, and shift is made to the processing of Act 6.

In the processing of Act 3, if there is no overlapping LED luminaire L, or in the processing of Act 4, if the state of the another group G is not ON, in the processing of Act 6, the CPU 13 controls the LED luminaire L at the light color assigned to the group G in which the state is changed. Besides, when the light color is recalculated in the processing of Act 5, in the processing of Act 6, the CPU 13 controls the LED luminaire L at the recalculated light color, and return is made to Act 1.

On the other hand, in the processing of Act 2, if a determination is made that the change of the state is OFF, in the processing of Act 7, the CPU 13 determines whether there is an LED luminaire L overlapping with another group G. If there is an overlapping LED luminaire L, shift is made to processing of Act 8. If there is no overlapping LED luminaire L, shift is made to processing of Act 10.

In the processing of Act 8, if there is an overlapping LED luminaire L, the CPU 13 determines whether the state of the another group G is ON or not. If the state of the another group G is ON, shift is made to processing of Act 9. If the state of the another group G is not ON, shift is made to the processing of Act 10.

In the processing of Act 9, if the state of the another group G is ON, the CPU 13 recalculates light colors of LED luminaires L overlapping with the another group G and adjacent LED luminaires L, and shift is made to the processing of Act 10.

In the processing of Act 7, if there is no overlapping LED luminaire L, or in the processing of Act 8, if the state of the another group G is not ON, in the processing of Act 10, the CPU 13 performs extinction control of the LED luminaire L of the group G in which the state is changed, and return is made to Act 1. Besides, when the recalculation of the light color is performed in the processing of Act 9, in the processing of Act 10, the CPU 13 controls the LED luminaire L at the recalculated light color, and return is made to Act 1.

As described above, in the lighting control system 1, when different light colors are assigned to the plural groups G, recalculation is performed so that the light color of an LED luminaire duplicately assigned to the plural groups G becomes an intermediate light color between the light colors assigned to the plural groups G, and the lighting control is performed. Further, the lighting control system 1 recalculates so that the light color of a certain LED luminaire L becomes an intermediate light color between light colors of LED luminaires L adjacent to the certain LED luminaire L, and performs the lighting control. As a result, since a change in light color between adjacent LED luminaires L can be made small, the color transition of the ceiling surface is smoothly represented.

Thus, according to the lighting control system of the embodiment, the light colors of the LED luminaires assigned to the plural groups can be lighting-controlled without feeling unnatural.

Incidentally, the respective Acts of the flowchart in this specification may be performed such that the execution sequence is changed, or plural Acts are simultaneously executed, or the Acts are executed in a different sequence for each execution.

Although exemplary embodiments have been described, these embodiments have been presented by way of example only, and are not intended to limit the scope of the invention. Indeed, these novel embodiments can be carried out in a variety of other forms, and various omissions, substitutions and changes can be made within the scope not departing from the spirit of the invention. These embodiments and modifications thereof fall within the scope and spirit of the invention and fall within the scope of the invention recited in the claims and their equivalents.

What is claimed is:

1. A lighting control system comprising:
    a central control apparatus;
    a plurality of luminaires whose light colors can be respectively changed and which are assigned to one of a plurality of groups to which different light colors are assigned or are duplicately assigned to the plurality of groups;
    a control part that generates control signals for controlling the light colors of the plurality of luminaires and causes a light color of a luminaire overlapping with the plurality of groups or adjacent to the plurality of groups to become an intermediate light color between respective assigned light colors of the plurality of groups when the plurality of luminaires assigned to the plurality of groups are lit and controlled; and
    an output part that is provided in the central control apparatus and outputs the control signals generated by the control part to the plurality of luminaires.

2. The system according to claim 1, wherein the control part generates a control signal for controlling the light color of the adjacent luminaire and causes the light color of the luminaire adjacent to the luminaire overlapping with the plurality of groups to become an intermediate light color between the light color assigned to the group and the light color of the overlapping luminaire.

3. The system according to claim 1, wherein:
    the control part generates light color information when the plurality of luminaires are lit and controlled,
    the output part outputs the light color information generated by the control part to the plurality of luminaires, and
    the plurality of luminaires are lit with light colors based on the light color information outputted from the output part.

4. The system according to claim 1, further comprising an assignment information table that stores assignment information of the plurality of luminaires assigned to the plurality of groups.

5. The system according to claim 1, wherein the central control apparatus includes an adjacency information table that stores adjacency information identifying a respective adjacent luminaire of each of the plurality of luminaires.

6. A central control apparatus for controlling a plurality of luminaires whose light colors can be respectively changed and which are assigned to one of a plurality of groups to which different light colors are assigned or are duplicately assigned to the plurality of groups, the apparatus comprising:
   a control part that generates control signals for controlling the light colors of the plurality of luminaires and causes a light color of a luminaire overlapping with the plurality of groups or adjacent to the plurality of groups to become an intermediate light color between respective assigned light colors of the plurality of groups when the plurality of luminaires assigned to the plurality of groups are lit and controlled; and
   an output part to output the control signals generated by the control part to the plurality of luminaires.

7. The apparatus according to claim 6, wherein the control part generates a control signal for controlling the light color of the adjacent luminaire and causes the light color of the luminaire adjacent to the luminaire overlapping with the plurality of groups to become an intermediate light color between the light color assigned to the group and the light color of the overlapping luminaire.

8. The apparatus according to claim 6, wherein:
   the control part generates light color information when the plurality of luminaires are lit and controlled, and
   the output part outputs the light color information generated by the control part to the plurality of luminaires that are lit with light colors based on the light color information.

9. The apparatus according to claim 6, further comprising an assignment information table that stores assignment information of the plurality of luminaires assigned to the plurality of groups.

10. The apparatus according to claim 6, further comprising an adjacency information table that stores adjacency information of a respective adjacent luminaire of each of the plurality of luminaires.

* * * * *